Dec. 23, 1958     O. MUSGRAVE     2,865,656
SIDE CAR ARRANGEMENT FOR GOLFING VEHICLE
Filed June 25, 1956     2 Sheets-Sheet 2
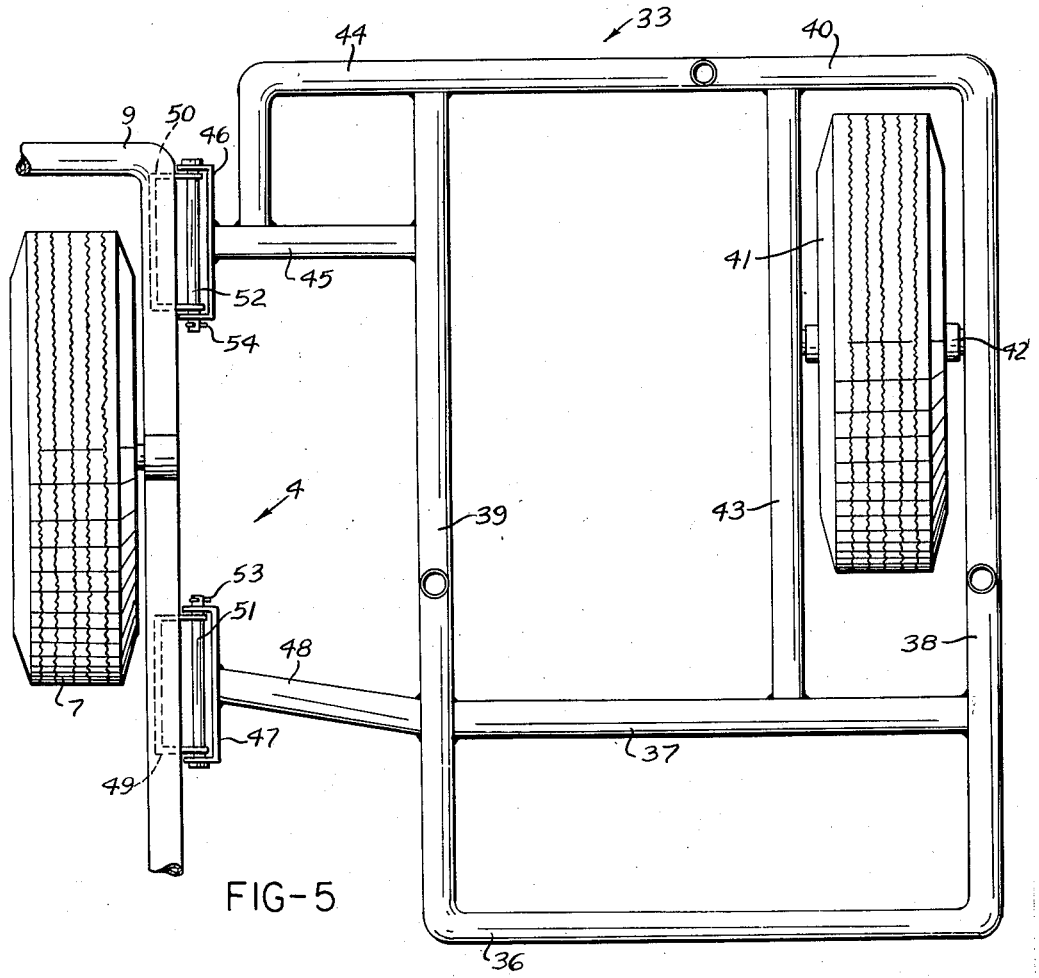
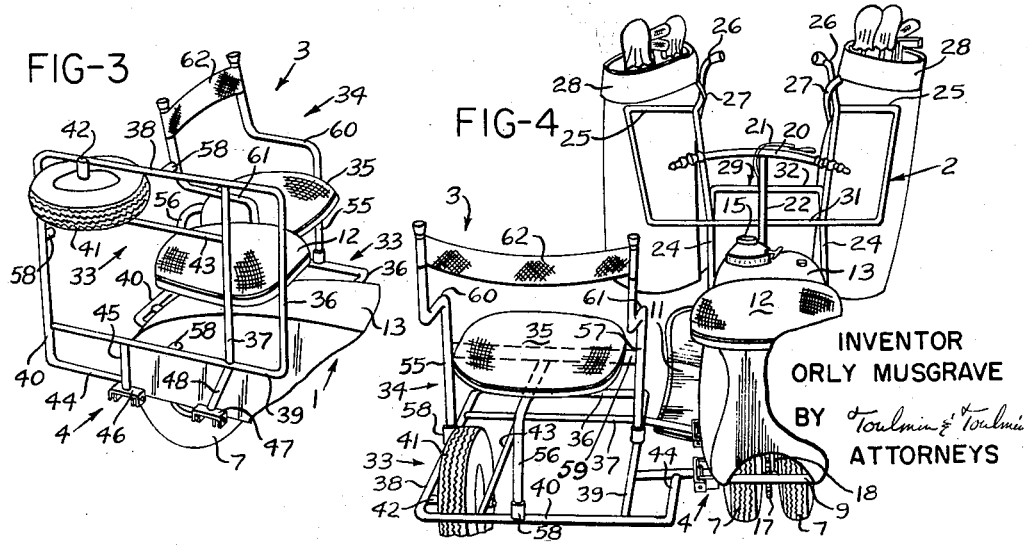
INVENTOR
ORLY MUSGRAVE
BY Toulmin & Toulmin
ATTORNEYS

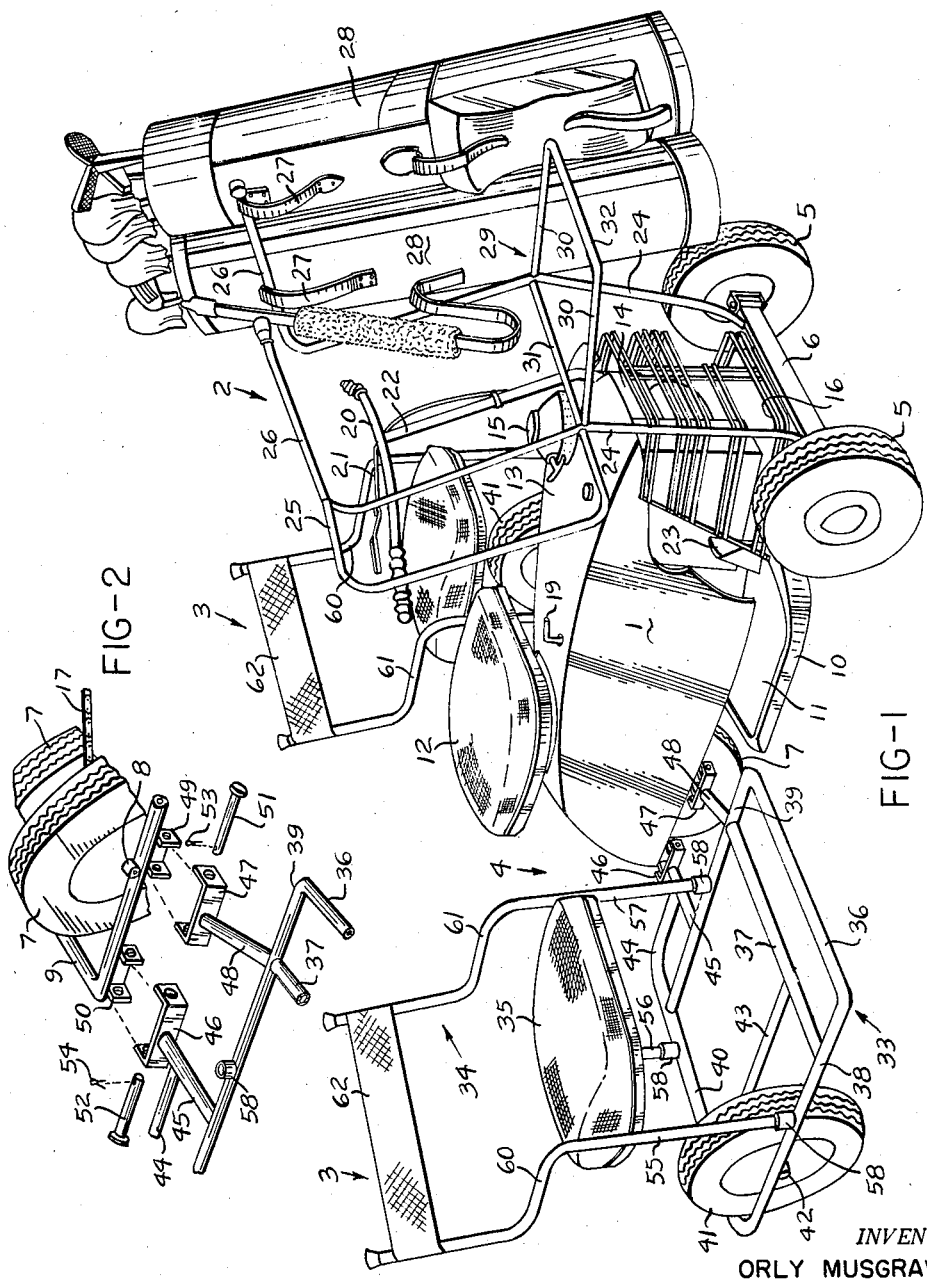

United States Patent Office 2,865,656
Patented Dec. 23, 1958

2,865,656

SIDE CAR ARRANGEMENT FOR GOLFING VEHICLE

Orly Musgrave, Springfield, Ohio

Application June 25, 1956, Serial No. 593,570

3 Claims. (Cl. 280—203)

This invention relates to cycling equipment and is particularly directed to such equipment for use by golfers.

In my co-pending applications, Serial No. 450,141, filed August 16, 1954, and Serial No. 535,553, filed September 19, 1955, there have been described low slung traction units or tractors adapted particularly for the mowing of grass. These and similar units are commercially available, and this invention particularly contemplates the combination of such tractors with an attachment side car. The tractors to which reference is made customarily have a relatively low rider's seat, a seat which is positioned substantially within seating reach from the ground level.

The invention has, as a primary object, the combination of a side car of a tractor device as described, in which an articulated connection is formed between the side car and tractor for free pivotal movement of the side car with respect to the tractor when the apparatus is passing over uneven terrain, such as commonly found on a golf course.

An important object of the invention is the provision of a tractor-side car combination for golfers and similar uses, in which combination the side car is arranged to form with the tractor an articulated connection, the side car being adapted to be pivoted into overlying relation with the said connection to permit the unit to pass over narrow bridges, for example.

Another object of the invention is to provide a novel side car having a seat within seating reach of the ground and wherein the seat is conveniently removable from the side car.

Yet another object of the invention is to describe a tractor having side cars and a driver's seat which is substantially within seating reach of ground level, the golf bag carrying bracket being provided on the tractor and so arranged that the view of a driver on the seat is not impeded by golf bags on the bracket.

These and other objects of the invention will be more fully understood by reference to the following detailed description and accompanying drawings wherein:

Figure 1 is a perspective view illustrating the preferred embodiment of the structure of invention, wherein a tractor having a seat within seating reach from the ground is provided with side cars laterally extending therefrom and a forward golf bag-carrying bracket;

Figure 2 is a perspective view with parts in exploded relation illustrating a mode of forming an articulated connection between a side car and a tractor in accordance with the invention;

Figure 3 is a fragmentary perspective view illustrating the combination of a tractor and side car with seat removed from the side car and the frame of the side car overlying the articulated connection between the tractor and the side car;

Figure 4 is a rear fragmentary view particularly illustrating the arrangement of the golf bag carrying bracket on the tractor; and Figure 5 is a fragmentary plan view illustrating the relationship between the tractor and the side car frame.

Referring to the drawings, first particularly to Figure 1, the numeral 1 generally designates a tractor useful in the practice of the invention; the number 2 designates a golf bag-carrying bracket situated forwardly on the tractor 1 and supported thereby.

The numeral 3 generally designates side cars which extend laterally from the tractor 1 and are secured thereto by an articulated connection indicated generally at 4.

It is apparent that the device of Figure 1 is adapted for the conveying of a plurality of golf bags and for accommodating at least three golfers in seated position.

Referring now specifically to the tractor 1, this unit is provided with spaced ground engaging forward wheels 5, pivotally connected to a cross bar 6. The tractor 1 is supported rearwardly by ground engaging wheel means 7, the wheel means being mounted in tubular bearings as at 8 supported from a tubular framing 9 of the chassis tractor. This tubular framing extends around the rear wheel means 7 on both sides of the tractor forwardly to the cross bar 6 to which it is suitably welded (not shown) and supports a platform 10, which is adapted at 11 for receipt of the foot of a driver mounted on the seat 12. The seat 12 is substantially within seating reach of ground level, it being unnecessary to climb onto the tractor; thus the driver may merely approach a tractor and seat himself thereon without stepping upwardly.

The platform 10 in the structure shown in Figure 1 supports beneath hood 13 a commercially available gasoline engine 14, usually of the 4-cycle type adapted to develop about 3 H. P. Indicated at 15 is a commonly provided recoil starter for the engine and cooling air to the engine passes inwardly of the hood 13 through a forwardly positioned grille 16.

In the particular tractor shown in the drawings the tractor is adapted to be driven through the rear ground engaging wheel means 7 by means of a chain 17 carried on the wheel shaft 18 (Figure 4) through suitable driving machanism between the engine and shaft 18, which mechanism is not shown. Such mechanism may take any of several forms and may include means for reversing the tractor operable from a shift lever as at 19.

It is to be understood that the particular tractor shown is examplary only and that the invention is not limited to any specific tractor or driving mechanism therefor of the kind described.

Forwardly on the tractor there is provided at 20 a steering handle carrying the usual controls 21, for effecting control of the engine 14, and which handle is operably connected with the forward ground engaging wheels 5 through a steering column 22 for steering the wheels. On the platform 10 at 23 there is indicated a foot control pedal for regulating tractor movement, the pedal being operably connected with the transmission mechanism of the tractor in a suitable manner (not shown).

The golf bag carrying bracket 2 is of a tubular frame construction and is supported from the cross bar 6. Most suitably the support means are in the form of vertically extending tubular members 24 welded to the cross bar. Tapering rearwardly of the tractor from the upper end of the members 24 are opposed golf bag receiving wings 25. Extending forwardly from each of the wings 25 in the direction of the members 24 are loop receiving tubular elements 26 which, as may be seen from the right hand portion of Figure 1, are adapted to have the usual handles 27 of golf bags 28 passed thereover when the bags themselves lie on the inclined wing portions.

Extending forwardly from the upper ends of the members 24 is a rectangular shaped bracket portion 29 which is provided with lateral members 30 for contacting the bags 28 to prevent the same from swinging inwardly toward the center line of the tractor. Transverse cross bars 31, 32 of the portion 29 connected the lateral members 30.

The bracket 2 thus described will conveniently support a minimum of four golf bags in the vertical relation shown in Figure 1, and the bags will be maintained free of the center line of the tractor to provide, as may be most clearly seen from Figure 4, a clear forward view for a driver of the tractor on the seat 12.

Also as shown in Figure 1 the side cars 3 comprise a support frame 33 having a chair-like structure designated generally by the numeral 34 mounted thereon. The frame 33 is open forwardly for access to the seat 35, which, as shown in Figure 1, is at a slightly lower level than the seat 12, being well within seating reach from the ground.

The frame is provided with forward transverse tubular members 36, 37 which provide a foot rest for the golfer on the seat 35 and which strengthen the frame. The frame is provided laterally with tubular members 38, 39 and with a rearward tubular portion 40. On the left hand side, as shown in Figure 1, there is provided a ground contacting wheel 41, which is mounted in suitable bearings as at 42 supported from members 38, 43. Extending forwardly from the rear tubular portion 40 is another portion 44 which joins with tubular portion 45 to support a fork 46. Forwardly on the frame 33 a second fork 47 is supported by the transversely extending tubular member 48. These forks provide for the formation of an articulated connected between the side car 3 and the tractor 1.

The tractor 1, as shown most clearly in Figure 2, is provided at 49, 50 with brackets welded to the tubular framing 9 and which brackets receive in overlying relation respectively the forks 47 and 46. The forks and brackets are apertured to receive pins 51, 52 and cotter pins 53, 54 are provided for retention of the forks, brackets and the pins in a unitary assembly and to provide for pivotal movement of the side car 3 with respect to the tractor 1.

It is to be particularly noted that the ground contacting wheel 41 of the side car 3 is positioned somewhat rearwardly of the wheel means 7 of the tractor; this arrangement provides for easy steering of the tractor.

Referring again to the side car 3, seat 35 is supported by tubular legs 55, 56, 57 which are telescoped into upstanding cup-like members 58 of the frame 33. The tubular leg 56, as may be most clearly seen from Figure 4, engages the seat 35 rearwardly and is bent at its upper end to provide a forwardly extending portion which is suitably welded to a transverse member 59 secured at its opposed ends to the tubular legs 55, 57.

The legs 55, 57 are configurated to form arm rests 60, 61 of the chair-like structure. The upper ends of these tubular legs are connected by a flexible metallic strapping 62 to complete the chair-like structure. The tubular legs 55, 57 have a degree of resiliency and in combination with the strapping 62 provide for comfortable riding, as the weight of a rider on the seat 35 is resiliently supported due to the ability of chair-like structure to flex.

Since each of the side cars 3 is identical to the other and since each is supported in the same manner from the tractor 1, the specific arrangement of only one side car has been described.

Referring now to Figure 3, the frame 33 of the side car 3 is shown therein to be hinged upwardly to lie in over-centering relation to the flexible or articulated connection 4. For this purpose the chair-like structure, including the seat 35, have been removed from the frame 33 in order to avoid interference between the chair-like structure of the side car and the components of the tractor 1.

The structure as indicated in Figure 3 is adapted to readily pass through narrow spacings or over narrow bridges which may sometimes be encountered while riding over terrain such as a golf course. Should, in some instances, it be desirable the frame 33 may conveniently be removed from the tractor entirely by simply disconnecting at the articulated connection 4.

It is to be noted that the structure thus described, when the tractor is powered by a 3 H. P. gasoline engine, is adapted to transport many times its own weight. The seat 35 closely positioned to the ground and mounted on the wheel frame 33 provides for comfortable riding, regardless of the terrain, and in either a forward or rearward direction. The apparatus is useful merely for the conveying of golf bags when it is desired to exclude the side cars. The apparatus whether employed with or without the side cars does not tend to tip and with the side cars the apparatus steers readily whether one side car or two be employed.

While the apparatus has been described particularly in connection with use on a golf course, the apparatus also has utility in places such as cemeteries, parks, and so forth, where inspection of the facilities by a number of persons is frequently required. For example, the unit of invention, under a full load of three riders and golf bags, is capable, when utilizing the 3 H. P. motor, if climbing steadily slopes having an angle of as much as 30 percent.

It will be understood that this invention is susceptible to modification in order to adapt it to different usages and conditions and accordingly, it is desired to comprehend such modifications within this invention as may fall within the scope of the appended claims.

I claim:

1. In combination, in a side car for attachment to a tractor, a frame having means for forming an articulated connection secured to the frame along a first lateral side thereof whereby the side-car is joinable to a tractor, a ground-contacting wheel carried by the frame disposed along a second and opposite lateral side of the frame rearwardly on the frame, a chair-like structure mounted on the frame having a seat provided between the said first and second frame sides and in vertical relation thereto, the chair-like structure including a trio of vertically extending legs releasably secured to the frame and providing support for the seat, two of the legs being mounted on the opposite sides of the frame forwardly of the wheel and being reversely bent upwardly of the seat, the third leg extending vertically from the rear of the frame to engage the seat rearwardly, the frame being open and unobstructed to the seat forwardly, and a flexible back strap secured to the upper ends of the said two legs flexibly uniting the legs rearwardly of the wheel center.

2. In combination, a tractor having a low slung chassis including rear wheel tractor-supporting means and framing carrying the wheel means at the level of the axis of the wheel means, a side car having a frame, a seat on the frame within seating reach from the ground, means joining the said frame and the framing of the chassis forming an articulated connection therebetween and providing support for the frame, said frame having a wheel also supporting the same, the wheel being journalled on the frame on the side thereof remote from the tractor and positioned rearwardly of the wheel means of the tractor beneath the side-car seat at the side of the side-car seat remote from the tractor.

3. In riding equipment for golfers, the combination of: a tractor having a seat within seating reach of ground level and a side car also having a seat within seating reach of ground level, a wheeled frame of the side car supporting the side car seat, means forming an articulated connection joining the side car frame to the tractor rearwardly on the tractor with the side car seat slightly rearwardly of and below the seat of the tractor, the seat of the side car being removable from the side car frame and the frame being pivotal upwardly to lie in over-centering relation to the articulated connection and laterally of the centerline of the tractor with the side car seat removed from the frame of the side car, the said frame being open and unobstructed forwardly.

References Cited in the file of this patent

UNITED STATES PATENTS

| | | |
|---|---|---|
| 1,099,851 | Irving et al. | June 9, 1914 |
| 1,628,771 | Frisk | May 17, 1927 |
| 1,683,169 | De Noya | Sept. 4, 1928 |
| 1,824,675 | Linn | Sept. 22, 1931 |
| 2,523,832 | Kunkel | Sept. 26, 1950 |
| 2,564,915 | Nelson | Aug. 21, 1951 |
| 2,590,965 | Huston | Apr. 1, 1952 |
| 2,749,997 | Deslippe | June 12, 1956 |

FOREIGN PATENTS

| | | |
|---|---|---|
| 885,239 | France | May 24, 1943 |
| 440,533 | Germany | Feb. 9, 1927 |
| 167,760 | Switzerland | May 16, 1934 |
| 303,139 | Switzerland | Jan. 17, 1955 |